(12) United States Patent
Quer et al.

(10) Patent No.: US 8,297,121 B2
(45) Date of Patent: Oct. 30, 2012

(54) MICRO-MACHINED ACCELEROMETER

(75) Inventors: Régis Quer, Saint Peray (FR); Olivier Lefort, Valence (FR); André Boura, Chatellerault (FR)

(73) Assignee: Thales, Neuilly-sur-Seine (FR)

( * ) Notice: Subject to any disclaimer, the term of this patent is extended or adjusted under 35 U.S.C. 154(b) by 577 days.

(21) Appl. No.: 12/575,837

(22) Filed: Oct. 8, 2009

(65) Prior Publication Data

US 2010/0089157 A1 Apr. 15, 2010

(30) Foreign Application Priority Data

Oct. 10, 2008 (FR) ...................................... 08 05615

(51) Int. Cl.
*G01P 15/097* (2006.01)
(52) U.S. Cl. .................................................... 73/514.29
(58) Field of Classification Search .................... 73/497, 73/514.29
See application file for complete search history.

(56) References Cited

U.S. PATENT DOCUMENTS

| | | | |
|---|---|---|---|
| 2,984,111 A | 5/1961 | Kritz | |
| 4,750,363 A | 6/1988 | Norling | |
| 4,970,903 A * | 11/1990 | Hanson | ...................... 73/862.59 |
| 5,567,879 A | 10/1996 | Fima et al. | |
| 7,124,633 B2 | 10/2006 | Quer et al. | |

FOREIGN PATENT DOCUMENTS

| | | |
|---|---|---|
| EP | 0 684 479 A1 | 11/1995 |
| FR | 2 848 298 A1 | 6/2004 |

* cited by examiner

*Primary Examiner* — John Chapman, Jr.
(74) *Attorney, Agent, or Firm* — Baker & Hostetler LLP

(57) ABSTRACT

A micromachined accelerometer in a flat plate includes a base and at least two resonator measuring cells provided with a common mobile seismic element, the two measuring cells being placed one on each side of the common mobile seismic element along the sensitive axis of the accelerometer, such that under the effect of an acceleration, the resonator of one measuring cell undergoes a traction while the resonator of the other measuring cell undergoes a compression, the measuring cells respectively configured to amplify the acceleration force generating the translation of the common mobile seismic element provided with a respective anchoring foot-piece. The common mobile seismic element includes at least two mobile seismic masses able to be displaced in translation along the sensitive axis of the accelerometer and/or in rotation with respect to a respective axis of rotation substantially orthogonal to the sensitive axis under the effect of an acceleration along the sensitive axis.

8 Claims, 2 Drawing Sheets

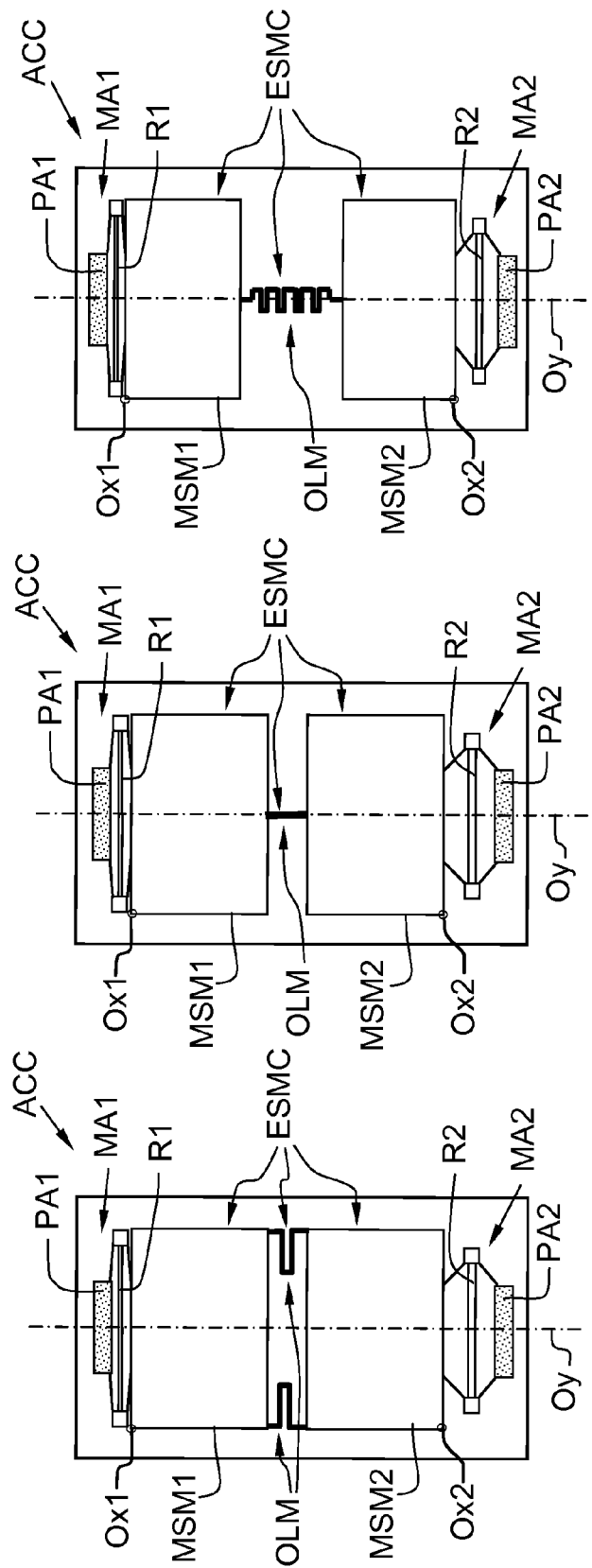

MICRO-MACHINED ACCELEROMETER

CROSS-REFERENCE TO RELATED APPLICATIONS

This application claims priority of French application no. FR 08/05615, filed Oct. 10, 2008, the disclosure of which is hereby incorporated by reference in its entirety.

FIELD OF THE INVENTION

The invention relates to a micromachined accelerometer in a flat plate comprising a base, and at least two resonator measuring cells, provided with a mobile seismic element capable of moving in translation and/or in rotation.

BACKGROUND OF THE INVENTION

A flat monolithic accelerometer conventionally comprises a body having a base and two measuring cells for the purpose of differential measurement. The flat structure allows simple and economic manufacturing, notably by chemical etching methods. A measuring cell typically comprises a seismic mass connected one the one hand to the base and on the other hand to a force sensor which is itself also connected to the base. When the accelerometer is subjected to an acceleration along the sensitive axis which is the axis of the acceleration to be measured, the seismic mass is subjected to an inertial force which is amplified and transmitted to the force sensor by means making it possible to amplify the transmitted force or displacement.

In a known way, the amplification is obtained by means of an arm called a lever arm which extends the seismic mass. The displacement of the seismic mass is transmitted to the force sensor by means of this lever arm. More precisely, the arm is connected to the base by an articulation making it possible for the mass to rotate about an axis perpendicular to the sensitive axis of the accelerometer and is connected to the force sensor by a hinge. When the accelerometer is subjected to an acceleration along the sensitive axis, the seismic mass is subjected to a force which makes it rotate about the articulation as therefore does the part of the lever arm connected to the force sensor.

The force sensor is a vibrating beam or beams sensor. The vibrating beam is connected to electrodes making it possible to make it vibrate at its resonant frequency and to a circuit for measuring the variation of its resonant frequency.

The measuring cells are mounted in such a way that when the accelerometer is subjected to an acceleration along the sensitive axis, one of the beams undergoes a traction force, the other beam undergoing a compression force of the same value, this traction or this compression causing the resonant frequency of the beam measured by the measuring circuit to vary. A differential measurement is thus obtained notably making it possible to avoid certain non-linear effects.

The variation of the resonant frequency is directly related to the displacement of the force sensor induced by the rotation of the part of the lever arm connected to the force sensor. The end of the beam also undergoes a certain rotation which often proves to be annoying, notably in the case of a tuning fork (that is to say of two beams forming a tuning fork) where the force transmitted to the two beams is not exactly identical.

Moreover, the machining quality of the hinges and articulations is of prime importance and constitutes one of the industrial limitations of this accelerometer.

In addition to the displacement being proportional to the length of the lever arm, the overall dimensions become greater when it is desired to obtain a large amplification ratio.

The French patent application FR 2 848 298 (THALES) proposes an accelerometer, such as shown in a simplified diagrammatic manner in the appended FIG. 1, whose amplification means MA1, MA2 do not comprise a lever arm used in rotation and generally comprise a respective resonator R1, R2 which can be a vibrating beam. This document describes an accelerometer ACC micromachined in a flat plate comprising a base and at least one measuring cell comprising a mobile seismic assembly ESMC comprising a mobile seismic mass connected to the base and able to move in translation along the sensitive axis Oy of the accelerometer under the effect of an acceleration $\gamma$ along this axis Oy. A resonator cell comprises a resonator able to vibrate and to undergo a traction or a compression, depending on the direction of the acceleration $\gamma$ and placed symmetrically with respect to the axis of symmetry S of the structure, this axis S being parallel with the axis Oy and passing through the center of gravity of the seismic mass. A measuring cell furthermore comprises means MA1, MA2 of amplification of the acceleration force generating the translation comprising at least one foot-piece PA1, PA2 for anchoring to the base, two rigid end-pieces of the resonator cell and two pairs of micromachined arms, the pairs being symmetrical with respect to the axis S, each pair comprising a first arm connecting a first point of attachment to an end-piece and a second point of attachment to the seismic mass, and a second arm connecting a third point of attachment to the same end-piece and a fourth point of attachment to the anchoring foot-piece, the angle $\alpha$ between the axis Ox perpendicular to the axis Oy. The line joining the first and second attachment points is symmetrical, with respect to the axis connecting the end-pieces through their center, with the angle between the axis Ox and the line joining the third and fourth attachment points and sufficiently small for the force applied in traction or in compression to the resonator to be greater than the acceleration force applied to the seismic mass.

Because of the symmetry of this structure, the displacements of the seismic mass, of the attachment end-pieces and of the resonator are perfectly axial. Moreover, the performance of this structure, that is to say the amplification ratio obtained, is simply determined by the angle $\alpha$; the geometry of the seismic mass, whose center of gravity is situated on the axis of symmetry S, has no effect on the performance of the accelerometer.

The amplification means described can be of the so-called "jack" or "butterfly" shape. FIG. 1 shows an example embodiment with amplification means having the "jack" shape.

Such a system comprising a single mobile seismic mass is relatively sensitive to thermal expansions of the materials outside of the measuring cells. Thus, the quality of the measurements of the accelerometer can be greatly degraded as such thermal deformations increase. Moreover, when the temperature of the structure is not homogeneous, parasitic stresses degrading the measurement can appear.

Systems are also known comprising two seismic masses MS1 and MS2, each connected to the base of the accelerometer, as shown diagrammatically in FIG. 2. Such two-mass systems are very sensitive to manufacturing spreads, notably with regard to the differential response of the two measuring cells in the presence of vibrations, the vibration mode of one mass, called the spring-mass mode, and the excess tension of the first detector can be different from those of the other mass, which has a considerably harmful effect on the differential gain in the presence of vibrations close to these modes.

Such systems are sensitive to manufacturing tolerances and to the thermal expansions undergone by the accelerometer and notably the attachment points.

SUMMARY OF THE INVENTION

One purpose of the invention is to overcome the various problems mentioned above, and notably to limit the interference generated by the thermal expansions undergone by the accelerometer to measurements made by the accelerometer.

According to one aspect of the invention, there is proposed a micromachined accelerometer in a flat plate comprising a base and at least two resonator measuring cells provided with a common mobile seismic element. The two measuring cells are placed one on each side of the common mobile seismic element along the sensitive axis of the accelerometer, such that under the effect of an acceleration, the resonator of one measuring cell undergoes a traction whilst the resonator of the other measuring cell undergoes a compression. Said measuring cells respectively comprise means of amplification of the acceleration force generating the translation of the common mobile seismic element provided with a respective anchoring foot-piece. Moreover, said common mobile seismic element comprises at least two mobile seismic masses able to be displaced in translation along said sensitive axis and/or in rotation with respect to a respective axis of rotation (Ox1, Ox2) substantially orthogonal to said sensitive axis under the effect of an acceleration along said sensitive axis, said two mobile seismic masses being connected to each other by a mechanical connecting member able to prevent, at least partly, deformations of the amplification means resulting from deformations of the accelerometer generated by external thermal stresses.

A coupled two-mass seismic element is thus obtained, without additional cost, capable of substantially limiting the impact on the measurements of deformations of the accelerometer generated by external thermal stresses.

Moreover, at low frequencies, typically frequencies lower than 1 kHz, the masses are coupled in such a way as to function like a single seismic mass.

Such an embodiment is easy to implement, has small overall dimensions and has no impact on the production process.

In one embodiment, the mechanical stiffness of the mechanical connecting member is lower that the mechanical stiffness of the assembly formed by said amplification means and said resonators.

A large reduction of the effect of the external thermal expansions or gradients is thus obtained.

According to one embodiment, said mechanical connecting member comprises at least one beam working in traction/compression, with respect to the sensitive axis.

Such an embodiment is of simple design and is inexpensive.

In one embodiment, said mechanical connecting member comprises at least one beam working in flexion, with respect to the sensitive axis.

Such an embodiment is highly compact.

For example, said mechanical connecting member comprises at least one folded arm.

Such an implementation is easy and of low cost.

According to one embodiment, the common mobile seismic element comprises two substantially identical seismic masses.

The production of two identical masses makes it possible to reduce the manufacturing costs.

According to another aspect of the invention, also proposed is a method of thermo-mechanical decoupling of a mobile seismic element common to two resonator measuring cells of a micromachined accelerometer in a flat plate comprising a base, said measuring cells respectively comprising means of amplification of the acceleration force generating the translation of the seismic element. Two mobile seismic masses of the mobile seismic element are mechanically connected in such a way as to prevent, at least partly, deformations of the amplification means resulting from deformations of the accelerometer generated by external thermal stresses.

In one embodiment, the mechanical stiffness of the mechanical connecting member is lower than the mechanical stiffness of the assembly formed by said amplification means and said resonators.

BRIEF DESCRIPTION OF THE DRAWINGS

The invention will be better understood on studying a few embodiments described by way of examples that are in no way limiting and illustrated by the appended drawings in which:

FIGS. 4, 5 and 6 show various examples of embodiment of an accelerometer according to an aspect of the invention.

In the various figures, the elements having the same references are identical.

DETAILED DESCRIPTION OF THE PREFERRED EMBODIMENTS

In the rest of the description, a resonator comprises two beams forming a tuning fork, vibrating with in phase opposition by means of two electrodes. This tuning fork configuration is shown in the figures. As a variant, it is also entirely possible to use resonators comprising one vibrating beam, several vibrating beams, or a torsion bar.

Figure 3:
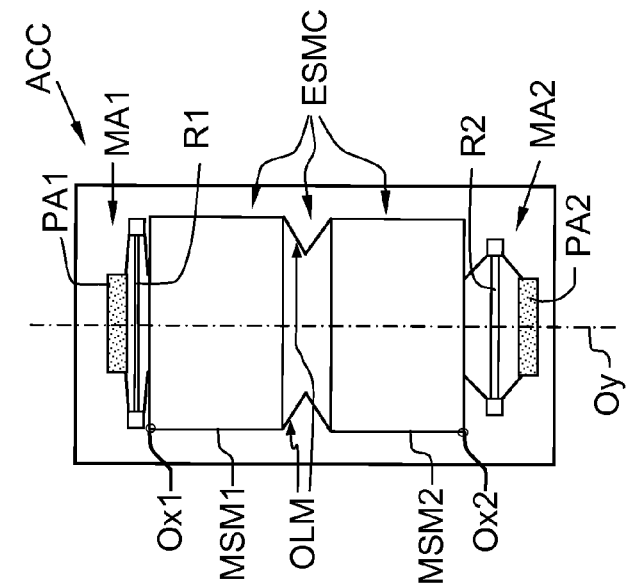
FIG. 3 is a diagrammatic drawing of an accelerometer according to one aspect of the invention.
Figure 2:
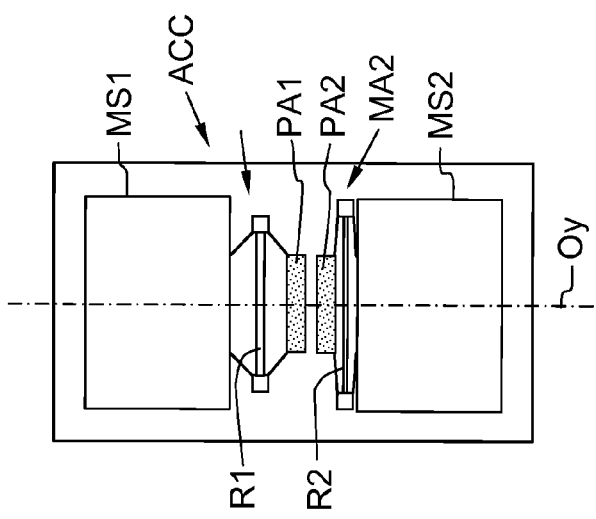
FIGS. 1 and 2 are diagrammatic drawings of an accelerometer according to the prior art.
Figure 1:
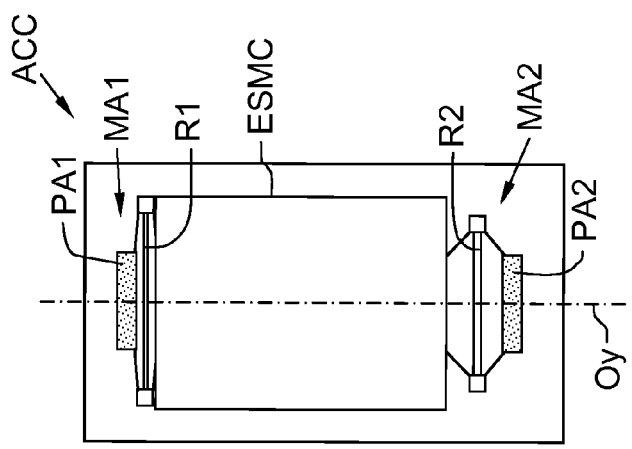

As shown in FIG. 3, a micromachined accelerometer ACC in a flat plate comprising a base, comprises two resonator measuring cells R1, R2 provided with a common mobile seismic element ESMC able to move in translation along a sensitive axis Oy of the accelerometer ACC under the effect of an acceleration along this axis Oy. The two resonator measuring cells are placed one on each side of the common mobile seismic element ESMC along the axis Oy such that, under the effect of an acceleration, the resonator R1, R2 of one measuring cell undergoes a traction whilst the resonator of the other measuring cell undergoes a compression. The measuring cells respectively comprise means MA1, MA2 of amplification of the acceleration force generating the translation of the seismic element, provided with an anchoring foot-piece PA1, PA2.

The common mobile seismic element ESMC comprises two mobile seismic masses MSM1, MSM2 connected to each other by a mechanical connecting member OLM able to prevent, at least partly, static deformations of the amplification means MA1, MA2 resulting from deformations of the accelerometer ACC generated by external thermal stresses.

In fact, under the influence of external thermal deformations, the flexible mechanical connecting member OLM deforms in such a way as to absorb these thermal deformations. At low frequencies, typically lower than 1 KHz, this mechanical connection allows the common mobile seismic element ESMC not to undergo stresses due to these thermal deformations, whilst retaining the mechanical functioning of a single seismic mass.

Of course, as a variant, the use of more than two mobile seismic masses connected in a chain by mechanical connecting members can be envisaged. For reasons of optimization taking account of the cost and of the complexity of embodiment, the use of two mobile seismic masses connected by a mechanical connecting member appears to be particularly advantageous.

FIGS. 4, 5 and 6 show different embodiments of the mechanical connecting member according to one aspect of the invention.

FIGS. 4 and 6 show mechanical connecting members of the beam type working in flexion, considering the movement along the axis Oy.

FIG. 5 shows a mechanical connecting member working in traction/compression, considering the movement along the axis Oy.

The invention of course also applies to accelerometers for which each of the mobile seismic masses MSM1, MSM2 can moreover be directly connected to a respective anchoring zone of the base, by respective hinges, the mobile seismic masses therefore also being able to undergo a rotation about these hinges.

Such an accelerometer makes it possible, without excess cost, by means of a coupled two-seismic mass element, to substantially limit the impact on the measurements of deformations of the accelerometer generated by external thermal stresses. Moreover, at low frequencies, typically frequencies below 1 kHz, the seismic masses are coupled in such a way as to function like a single seismic mass. Such an embodiment is easy to implement, has low overall dimensions and has no impact on the production process.

The invention claimed is:

1. A micromachined accelerometer in a flat plate comprising a base and at least two resonator measuring cells provided with a common mobile seismic element, the two measuring cells being placed one on each side of the common mobile seismic element along the sensitive axis of the accelerometer, such that under the effect of an acceleration, the resonator of one measuring cell undergoes a traction whilst the resonator of the other measuring cell undergoes a compression, said measuring cells respectively comprising means of amplification of the acceleration force generating the translation of the common mobile seismic element provided with a respective anchoring foot-piece, wherein said common mobile seismic element comprises at least two mobile seismic masses able to be displaced in translation along said sensitive axis and/or in rotation with respect to a respective axis of rotation substantially orthogonal to said sensitive axis under the effect of an acceleration along said sensitive axis, connected to each other by a mechanical connecting member able to prevent, at least partly, deformations of the amplification means resulting from deformations of the accelerometer generated by external thermal stresses.

2. The accelerometer as claimed in claim 1, in which the mechanical stiffness of the mechanical connecting member is lower that the mechanical stiffness of the assembly formed by said amplification means and said resonators.

3. The accelerometer as claimed in claim 1, in which said mechanical connecting member comprises at least one beam working in traction/compression, with respect to the sensitive axis.

4. The accelerometer as claimed in claim 1, in which said mechanical connecting member comprises at least one beam working in flexion, with respect to the sensitive axis.

5. The accelerometer as claimed in claim 4, in which said mechanical connecting member comprises at least one folded arm.

6. The accelerometer as claimed in claim 1, in which the common mobile seismic element comprises two substantially identical seismic masses.

7. A method of thermo-mechanical decoupling of a mobile seismic element common to two resonator measuring cells of a micromachined accelerometer in a flat plate comprising a base, said measuring cells respectively comprising means of amplification of the acceleration force generating the translation of the common mobile seismic element, comprising mechanically connecting two mobile seismic masses of the common mobile seismic element in such a way as to prevent, at least partly, deformations of the amplification means resulting from deformations of the accelerometer generated by external thermal stresses.

8. The method as claimed in claim 7, in which the mechanical stiffness of the mechanical connecting member is lower than the mechanical stiffness of the assembly formed by said amplification means and said resonators.

\* \* \* \* \*